Patented Dec. 20, 1949

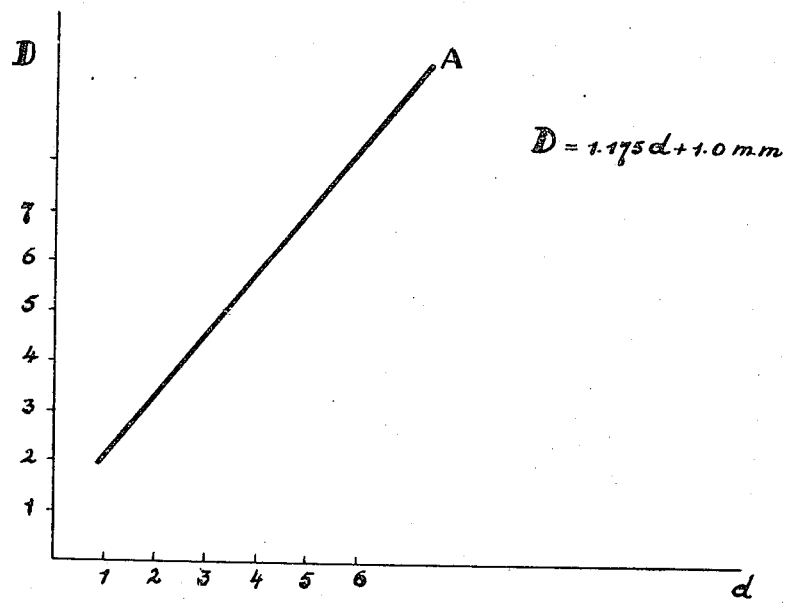

2,491,593

UNITED STATES PATENT OFFICE 2,491,593

COATED WELDING ROD FOR ELECTRIC ARC WELDING

Paul Christiaan van der Willigen, Eindhoven, Netherlands, assignor to Hartford National Bank and Trust Company, Hartford, Conn., as trustee Application May 2, 1947, Serial No. 745,445
In the Netherlands September 4, 1946

3 Claims. (Cl. 219—8)

For electric arc-welding it is known to make use of iron rods which are provided, by dipping or pressing with a coating which consists of a mixture of different mineral constituents and a binding agent, usually having silicates as their base, which mixture may also contain organic material.

Among these differently coated welding rods several kinds have come to the fore in the course of time, for instance the iron oxide kind, the fluoride kind and the organic kind.

Furthermore it is known to add a quantity of metal in a finely divided state as a constituent to the coating.

The invention concerns those coated welding rods of the aforesaid organic kind which contain organic material and in addition, as a main constituent, $TiO_x$ ($x$ being smaller or equal to 2), calcium carbonate and metal powder. These welding rods are used for electric arc-welding of kinds of steels, used for instance for construction, ship building, coach building, boiler making and so on.

The welding rod according to the invention is characterized in that the iron core is coated with a slag forming mass having the following composition (in per cent by weight):

| | Per cent |
|---|---|
| $TiO_x$ ($x=2$ or less) | 10 to 40 |
| $CaCO_3$ | 4 to 10 |
| Ferroalloy | 3 to 8 |
| Clay | 0 to 10 |
| Organic material | 5 to 30 |
| Iron | 30 to 50 |
| KNa silicate | 3 to 9 |

External diameter $D > 1.175d + 1.0$ mm., $d$ being the core diameter.

For making this better understood the accompanying drawing represents a line A which is drawn in accordance with the said formula for the minimum thickness of the coating with different core diameters. These minimum thicknesses of the coating are greater than is customary with coated welding rods containing titanium oxide and organic material. The welding rod according to the invention has outstanding advantages. It permits the welding method known as "vertical downwards welding" to be carried out by pressing the welding rod against the work piece and moving the welding rod downwards while being in contact therewith, thus obtaining an eye appealing welding bead or run having a concave shape, which is very suitable for compensating the obvious distribution of strain. Owing also to the complete absence of undercutting and the favourable mechanical properties of the deposited material no cracks occur in welded joints established in this way.

If a welding rod according to the invention is used for welding in any other welding position according to the normal method, for instance "tilted," "flat fillet" or "overhead," welds are obtained which are particularly eye appealing, an outstanding feature being that removal of the slag, which remains on the welding run after welding, can readily take place. Notably in the welding position termed "vertical downwards welding" this simple separation of the slag is remarkable and it may even occur that the slag becomes detached from the welding run during welding operation.

The mechanical properties of the deposited material contrast very favourably with those of other welding rods of a similar kind.

In carrying through the invention it has furthermore been found that the welding rods are moistureproof and permit of obtaining quality welds not only with wet constructional parts, for instance a welding seam from which water is flowing, but also at points entirely or completely below the water surface.

In addition reference is made to the particular property of a great length of welding per welding rod, which is obtainable more particularly by means of the aforesaid welding method "vertical downwards welding." Thus, for instance, a welding rod according to the invention having a core wire of 5 mms. and a coating of 8 mms. thick permits of depositing, by "vertical downwards welding," a welding run, having a length of 75 cms. with a length of 45 cms. of the welding rod. For a welding rod of the aforesaid similar and known kind use may be made of a maximum core diameter of 4 mms. which in the case of the rod having a length of 35 cms., yields a welding bead of 25 cms.

For welding rods according to the invention use may be made, in any welding position occurring in practice, of the same welding current, so that it need not be altered on changing the welding position. This is of importance, for instance, to a vertical circular welding seam.

The conductivity of the coating according to the invention is sufficient for the welding rod to ignite easily so that extinction does not occur.

When making use of the invention it is advantageous to use reduced titanium iron ore, for instance ilmenite reduced to Fe and $TiO_x$. In this case, however, the quantity of Fe obtained is too small and, according to the invention, requires to be completed.

As examples of a welding rod according to the invention I may mention:

| | Per cent |
|---|---|
| Rutile | 26.5 |
| Calcareous spar | 7 |
| Ferromanganese | 6 |
| Clay | 7 |
| Wood flour | 7 |
| Iron powder | 40 |
| KNa silicate | 6.5 |

Core wire $d=4.0$ mm.
External diameter $D=7.0$ mm.

| | Per cent |
|---|---|
| Reduced ilmenite (FeTiO$_2$) | 45 |
| Calcareous spar | 7 |
| Ferromanganese | 6 |
| Clay | 7 |
| Wood flour | 7 |
| Iron powder | 21.5 |
| KNa silicate | 6.5 |

Core wire $d=4.0$ mm.
External diameter $D=7.0$ mm.

What I claim is:

1. A welding rod for electric arc-welding having an iron core which is provided with a coating mass containing organic material, titanium oxide, calcium carbonate and metal powder as main constituents, the composition in per cent. by weight being as follows:

| | Per cent |
|---|---|
| TiO$_x$ ($x=2$ or less) | 10 to 40 |
| CaCO$_3$ | 4 to 10 |
| Ferroalloy | 3 to 8 |
| Clay | 10 or less |
| Organic material | 5 to 30 |
| Iron | 30 to 50 |
| KNa silicate | 3 to 9 |

External diameter $D>1.175d+1.0$ mm., $d$ being the core diameter.

2. A welding rod for electric arc-welding having an iron core which is provided with a coating mass characterized by the following composition by weight:

| | Per cent |
|---|---|
| Rutile | 26.5 |
| Calcareous spar | 7 |
| Ferromanganese | 6 |
| Clay | 7 |
| Wood flour | 7 |
| Iron powder | 40 |
| KNa silicate | 6.5 |

3. A welding rod for electric arc-welding having an iron core which is provided with a coating mass characterized by the following composition by weight:

| | Per cent |
|---|---|
| Reduced ilmenite | 45 |
| Calcareous spar | 7 |
| Ferromanganese | 6 |
| Clay | 7 |
| Wood flour | 7 |
| Iron powder | 21.5 |
| KNa silicate | 6.5 |

PAUL CHRISTIAAN van der WILLIGEN.

REFERENCES CITED

The following references are of record in the file of this patent:

UNITED STATES PATENTS

| Number | Name | Date |
|---|---|---|
| 2,000,861 | Miller | May 7, 1935 |
| 2,053,956 | Humberstone et al. | Sept. 8, 1936 |
| 2,220,954 | Chapman | Nov. 12, 1940 |
| 2,355,988 | Mathias | Aug. 15, 1944 |
| 2,410,461 | Ronay | Nov. 5, 1946 |
| 2,429,175 | Van der Willigen | Oct. 14, 1947 |

FOREIGN PATENTS

| Number | Country | Date |
|---|---|---|
| 394,319 | Great Britain | June 9, 1933 |
| 417,195 | Great Britain | Oct. 1, 1934 |